Patented Jan. 6, 1953

2,624,718

UNITED STATES PATENT OFFICE 2,624,718

VINYL RESIN DISPERSIONS

Irving I. Bezman, Pittsburgh, and Daniel D. Browning, Lancaster, Pa., assignors to Armstrong Cork Company, Lancaster, Pa., a corporation of Pennsylvania No Drawing. Application July 24, 1951, Serial No. 238,397

3 Claims. (Cl. 260—29.6)

This invention relates to vinyl resin dispersions having low viscosities and high solids contents and a method of making the same. More particularly, the invention relates to the production of vinyl resin dispersions in which the solids content of the dispersion is at least 50% and in which the viscosity of the dispersion is reduced by the addition thereto of small but effective amounts of water so that the dispersions are capable of being applied to hard surface floor coverings as a decorative wearing surface by means of conventional block printing techniques.

Vinyl resins are widely employed in coating compositions. As used herein, the term "vinyl resin" is intended to include the virtually insoluble or difficultly soluble vinyl resins, such as the delta and gamma polyvinyl chloride. In addition to these materials, the more soluble vinyl resins, such as beta polyvinyl chloride; copolymers of vinyl chloride and vinyl acetate, which have average molecular weights above 16,000, as determined by Staudinger's method and contain vinyl chloride in the range of about 90% to 97% by weight; as well as copolymers of vinyl chloride and dibutyl maleate, ethyl acrylate, methyl acrylate, butyl acrylate, methyl methacrylate, and butyl methacrylate, all contain substantially the same amount of combined vinyl chloride and have the same average molecular weight. In addition, copolymers of vinyl chloride and acrylonitrile containing 45% to 80% vinyl chloride may be used, as well as certain copolymers of vinyl chloride and vinylidene chloride. Such resins may be characterized as vinyl resins which are substantially insoluble in toluene at 25° C. In other words, toluene in the ratio of 10 parts of toluene to 1 part of resin will extract a fraction amounting to no more than 15% of the entire resin. The term "vinyl resin" as used herein is intended to define these toluene insoluble resins.

The use of toluene insoluble vinyl resin coating compositions has presented at least one serious problem, because highly concentrated solutions cannot be prepared due to the tendency of these resins to gel when used in high concentrations. Therefore, in order to obtain a coating with hiding power and wear resistance, a rather large number of applications are required. In order to overcome this problem, there have been developed suspensions of vinyl resins in plasticizers therefor. By means of these suspensions, which are fairly fluid, one can apply a high solids coating which, upon the application of heat, develops a film having the desirable characteristics of good hiding power and wear resistance. In some instances, where it is desired to have a less viscous material as a coating composition, organic diluents have been added thereto. The suspensions of resin in plasticizer are known to the art as plastisols. The species of plastisol which contains an organic diluent is known as an organosol. Such materials may be described as a suspension of vinyl resin in a liquid organic suspending medium, which in a plastisol is the plasticizer, such as dibutyl phthalate, dioctyl phthalate, tricresyl phosphate, butyl phthalyl, butyl glycollate, and the like. In an organosol, the liquid organic suspending medium includes a plasticizer and a diluent such as a hydrocarbon, which is a nonsolvent for the vinyl resin.

In certain applications of vinyl resin coating composition, such as the production of floor coverings by the block printing technique, comparatively low viscosities are required in order to successfully apply the coating by the printing blocks. To produce these low viscosities, ketones and aromatic solvating agents for the vinyl resin are widely employed. There has been some work done to produce low viscosity coatings by means other than the use of ketones and aromatic solvating agents. Ketones are generally high boilers and are, therefore, difficult to remove from the film during fusion. In addition, they are expensive and add considerably to the cost of the coating.

As used herein, the term "low viscosity coating" is one which possesses a low viscosity and contains small amounts of volatile material, at the same time containing a vinyl resin in an amount in excess of about 50% by weight of the dry solids content thereof. These suspensions of vinyl resin are advantageously such that they can be employed in the production of hard surface floor coverings by block printing methods. Such coating compositions should be characterized by a viscosity index of not less than 1.67 when not more than 5% of volatile material is present in the dispersion. A dispersion so characterized may be block printed to form a smooth decorative wearing surface on hard surface floor covering which has satisfactory appearance and excellent wearing properties. Dispersions of vinyl resins that have viscosity indices of less than 1.67 with 5% volatile material present or those that require the addition of more than 5% volatile materials to obtain a viscosity index of at least 1.67 are unsuitable for the production of hard surface floor coverings by the block printing technique.

As used herein, the term "viscosity index" is the slope of the curve which is obtained when the deflections shown on a variable speed standard model Brookfield synchro-electric viscosimeter are plotted as abscissae against the revolutions per minute required to produce the deflections as ordinates. The deflections may be measured with any suitable spindle, but the data are plotted on the basis of the deflection that would be obtained, actually or theoretically, on the No. 7 spindle. Deflections are at spindle speeds of 2, 4, 10, and 20 revolutions per minute, while the dispersion is at a temperature of 25° C. The well-known techniques specified for use in measuring viscosities with the Brookfield synchro-electric viscosimeter are applied to obtain the data required for determining the viscosity indices of the vinyl resin dispersions.

The above dispersions can be block printed by conventional methods, which, as is well known in the art, includes a method whereby the material to be coated is passed through an apparatus containing a series of blocks. These blocks are dipped into a container of the coating composition and various designs are applied by means of the block to the coated base material which is normally a saturated felt.

We have found that high solids content organosols having low viscosities may be prepared by adding a small but effective amount of water to the suspension of vinyl resin in liquid organic suspending mediums, such as a plasticizer therefor, and containing a nonsolvent diluent for the vinyl resin. This is directly contrary to the generally accepted theories regarding the use of these vinyl resins in the preparation of coating compositions. Generally speaking, it is recommended that the materials be dried before incorporation in coating compositions.

While the quantity of water varies somewhat, depending upon the particular resin employed in the preparation of the composition, generally speaking, we have found that 0.1% to 0.5% by weight of water on the weight of the composition is effective to reduce the viscosity to such an extent that the materials may be used in various applications where low viscosities are required, such, for example, as the block printing method of making hard surface floor coverings referred to hereinabove. When less than 0.1% of water is added to the composition, the viscosity reduction is so small as to be classified as an insignificant amount. When more than about 0.5% water is added to the composition, the viscosity begins to increase and thereby the composition is unsuitable for the desired uses.

In accordance with our invention, the suspension of vinyl resin in plasticizer is first prepared by conventional means. The selected amount of water is then added, and after a short period of agitation, such as simple stirring in order to disperse the water throughout the composition, the viscosity is reduced to the desired point.

Our invention may be illustrated by the following table, which indicates the criticality of the amount of water added to compositions in accordance with our invention.

terminations are illustrated by the following example, the resin of the example being set forth specifically in the table:

Example

| | Parts by weight |
|---|---|
| Resin | 100 |
| Pigment | 63 |
| Chlorowax (chlorinated paraffin) | 10 |
| Dioctyl phthalate plasticizer | 33 |
| Wetting agent [Sterox-SE (polyoxyethylene ether)] | 8 |
| Lead sulfate stabilizer | 2 |
| Diluents (hydrocarbon composition containing 40% aliphatic hydrocarbons and 60% aromatic hydrocarbons) | 73 |

While certain resins have been set forth in the above table, it is to be understood that these are only representative of a large number of materials which are toluene insoluble vinyl resins and which may be employed in the practice of our invention.

By means of our invention, we have produced suspensions of vinyl resins in liquid organic suspending mediums, including plasticizer and diluent, which suspensions contain at least 50% by weight solids and which are characterized by low viscosities, thereby enabling the use of the composition in arts wherein low viscosity coatings with high solids content are required. The resin-to-plasticizer ratio of the composition of our invention may vary between 5 to 1 to 1 to 1.

We claim:
1. The product of the process of claim 2.
2. A method of making a coating composition of low viscosity and high solids content comprising suspending a vinyl resin of the group consisting of polymers of vinyl chloride and copolymers of vinyl chloride containing at least 45% vinyl chloride in a liquid organic suspending medium, including a plasticizer and diluent, and adding to the resulting suspension 0.1% to 0.5% by weight thereof of water, thereby reducing the viscosity of said composition.
3. A method of making a coating composition of low viscosity and high solids content comprising suspending polyvinyl chloride resin in a liquid organic suspending medium, including a plasticizer for said resin and a diluent which is a non solvent for said resin, and adding to the resulting suspension 0.1% to 0.5% by weight thereof of water, thereby reducing the viscosity of said composition to a viscosity characterized by a viscosity index of at least 1.67 when not more than 5% volatile material is contained therein.

IRVING I. BEZMAN.
DANIEL D. BROWNING.

Table

| Resin Type | Trade Name | Orig. Visc. | Percent H₂O | | | | | | |
|---|---|---|---|---|---|---|---|---|---|
| | | | 0.08 | 0.16 | 0.24 | 0.32 | 0.40 | 0.48 | 0.56 |
| Vinyl Chloride | Geon 100X26S | 9,900 | 3,880 | 1,880 | 1,080 | 980 | 1,160 | 1,560 | |
| Vinyl Chloride | Geon 121 | 1,460 | 920 | 740 | 640 | 620 | 600 | 640 | 700 |
| Vinyl Chloride Acetate | Carbide VYNV-3 | 2,380 | 1,320 | 720 | 600 | 560 | 760 | 980 | 1,240 |
| Vinyl Chloride mod. by maleic anhydride. | Goodyear Pliovic AO. | | | | | 2,200 | 2,400 | 2,480 | 2,600 |

In obtaining the data for the above table, the viscosities are centipoises and were measured by means of a Brookfield viscosimeter at 10 R. P. M. The blank spaces indicate that no materials having such composition were tested.

The formulations used in making the above determinations

REFERENCES CITED

The following references are of record in the file of this patent:

Partridge et al.: Rubber Age, vol. 67, No. 5, August 1950, pp. 553-560.